June 14, 1955  F. J. PILIA  2,710,902
ROD FEED FOR MANUAL ARC WELDING
Filed Jan. 31, 1951
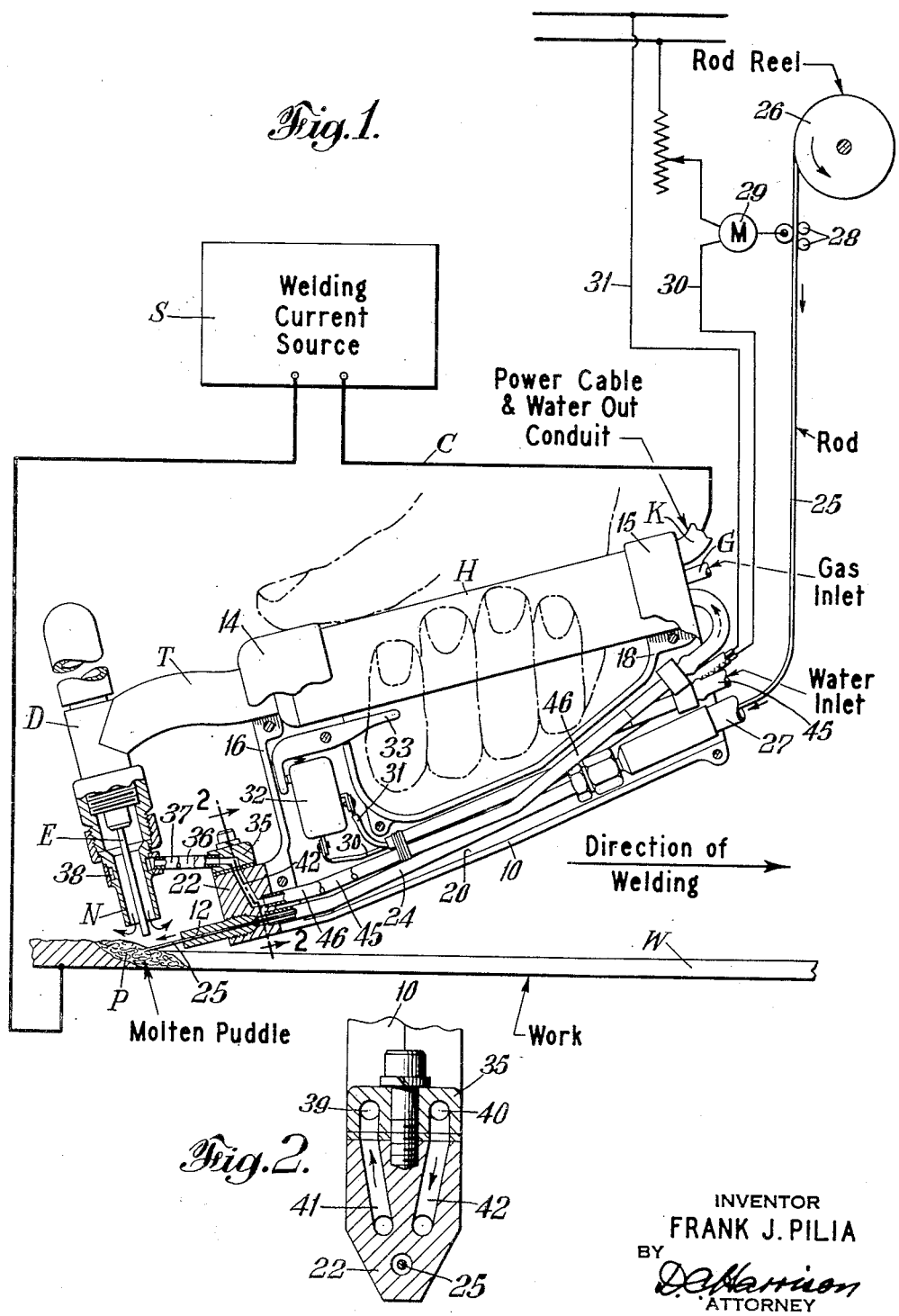
INVENTOR
FRANK J. PILIA
BY
D. C. Harrison
ATTORNEY United States Patent Office 2,710,902
Patented June 14, 1955

2,710,902

ROD FEED FOR MANUAL ARC WELDING

Frank J. Pilia, West Orange, N. J., assignor to Union Carbide and Carbon Corporation, a corporation of New York Application January 31, 1951, Serial No. 208,746

17 Claims. (Cl. 219—10)

This invention relates to a rod feed for manual inert gas shielded arc welding.

In the machine type of inert gas shielded tungsten arc welding, the torch has been mounted on a motorized carriage self-propelled at welding speed, and filler rod has been supplied to the weld puddle by a motorized rod feed through a relatively rigid guide tube. This machine type or carriage propelled type of welding is restricted to substantially straight line welding.

In the manual type of inert gas shielded tungsten arc welding, the torch has been propelled by the hand of the operator, and filler rod has been manually supplied by the other hand of the operator. The manipulation of this torch is universal, as it can be hand guided to weld in any position and to follow any contour. However, it is difficult to simultaneously guide the torch and feed the filler rod by hand, and the speed of filler rod feed depends entirely upon the skill of the operator.

Objects of the invention are to provide a mechanized filler rod feed for inert gas blanketed arc welding which is flexible to permit relatively free manipulation of the torch in hand welding, to provide a rod feed which propels the torch in the direction opposite to the direction of rod feed, and to provide a convenient mounting for the filler rod guide on the hand manipulated torch.

According to the present invention, a filler rod guide is maintained at an acute angle to the workpiece, and the torch is propelled along the line of weld in the direction opposite to the direction of rod feed by reaction of the component of force of the rod feed which is parallel to the work surface. The torch is preferably propelled at substantially the same speed as the filler rod is fed through the guide. The filler rod is fed to the guide through a flexible conduit, which permits relatively free manipulation of the guide, which is mounted on a bracket secured to the torch handle. The torch nozzle and rod guide are water cooled, and the bracket supports conduits for the filler rod and water supply, and insulated conductors for a switch to control the motorized rod feed.

In the drawing:

Figure 1 is a diagram of apparatus according to, and for carrying out the method of, the present invention; and Figure 2 is a substantially vertical cross-section taken along the line 2—2 of Figure 1.

The inert gas blanketed arc welding torch shown in the drawing is of the type shown in Herbst Patent No. 2,468,805, and comprises an insulated tubular shank T provided with a handle H which is a rigid tube of insulating material, and a head D transverse to the shank T and which supports the electrode E and the nozzle N.

A gas conduit G passes through the handle H, shank T and head D to the nozzle N to pass an annular stream containing inert monatomic gas such as helium or argon, along the electrode E to shield the arc and weld puddle. The head D and the torch shank T are water cooled, the cooling water being discharged through the hollow shank T. The water outlet hose K contains an electric cable C, which supplies electric welding current through the shank T to the electrode E.

According to the present invention, the torch handle H is provided with a depending bracket 10 for supporting a filler rod guide 12 at a wide angle to the electrode E and at an acute angle to the surface of the work W. In the form shown, the bracket 10 comprises front and rear ferrules 14 and 15 encircling the ends of the torch handle H. The bracket 10 is preferably in two halves, for convenience in assembly, each of which is substantially U-shaped. The bracket 10 has a front leg 16, a rear leg 18, and a connecting tubular bridge 20, forming a saddle, cradle, or cable hanger, allowing convenient clearance for the hand of an operator grasping the handle H.

The front leg 16 carries a guide block 22 in which the filler rod guide 12 is mounted in a position below the outlet of the nozzle N and at substantially right angles to the electrode E. The guide block 22 connects the guide 12 to a guide tube 24 passing through the tubular bridge 20. The filler rod 25 is supplied by a reel 26, and is fed to the tube 24 through a flexible conduit 27, by nip rollers 28 driven by a motor 29. The motor 29 is connected by flexible insulated electric conductors 30 and 31 which pass through the tubular bridge 20 to a switch 32 mounted in the front leg 16. The switch 32 is operated by a trigger 33 also mounted in the front leg 16, and projecting rearwardly convenient to the hand grasping the handle H.

The filler rod guide 12 is rigidly connected to the nozzle N. In the form shown, the guide block 22 has secured thereto a cap 35, connected by tubes 36 and 37 with a cooling jacket 38 in the nozzle N, and forming a rigid strut. The cap 35 has passages 39 and 40 connected with passages 41 and 42 in the guide block 22. Cooling medium is supplied by a tube 45 in the tubular bridge 20 and connected to the passage 41, so that cooling medium passes through passages 39, 36, 38, 37, 40, 42 and out through tube 46 connected to the passage 42. The tube 46 passes out through the tubular bridge 20, and is bent back and connected to the fluid inlet of handle H, so as to pass cooling medium through the torch head cooling jacket and out through conduit K.

In operation, the workpiece W and the electrode E are connected to the terminals of a welding current source S, and cooling medium is circulated through the passages as described. The torch is held so that the electrode makes a wide angle, preferably approximately 70° to the surface of the workpiece, and the filler rod guide 12 makes an acute angle, for example 20° to the workpiece. An arc is struck between the electrode E and the Work W, to form a weld puddle P.

The trigger 33 is operated to close the switch 32, which starts the motor 29, and the nip rollers 28 feed the filler rod 25 from the reel 26 through the flexible cable 27 and guide 12 into the weld puddle P. The filler rod preferably protrudes approximately ½ to ⅜ of an inch from the guide 12 in such a manner that it contacts the work in the weld area.

Preferably pressure is applied to the torch by the operator in a downward direction toward the workpiece and slightly in the direction the torch is to travel. The filler rod then develops sufficient friction between the end where it is being melted by the arc stream and the work to propel the torch along in the direction from which the filler rod is being fed. The rate at which the filler rod burns off determines the spacing between the end of the electrode and the workpiece.

Approximately one unit of length of filler rod is deposited for an equal length of welded joint. The operator directs the filler rod so that it remains over the centerline of the welded joint until completion of the weld. Then the lever 33 is released and the torch is withdrawn from the workpiece, interrupting the arc.

With this process it is possible to obtain the quality and economy of fully automatic welding while combining it with the versatility of manual welding. Joint fit-ups ranging from a tight butt in 0.037 inch mild steel to a 3⁄32 inch gap are welded with welding speeds ranging from 60 to 80 inches per minute and filler rod ranging from 1⁄32 to 3⁄32 inch diameters, in flat, horizontal, and vertical positions.

I claim:

1. Method of arc welding with a torch movable along a line of weld and having a filler rod guide, which comprises striking an arc to heat a portion of a workpiece to form a weld puddle, feeding filler rod through said guide into said weld puddle, maintaining said guide at an acuate angle to the surface of the workpiece, and propelling said torch along the line of weld in the direction opposite to the direction of rod feed by reaction of the component of force of the rod feed parallel to the work surface.

2. Method as claimed in claim 1, in which the torch is propelled at substantially the same speed as the filler rod is fed through the guide tube.

3. Method of shielded arc welding with a torch movable along a line of weld and having a filler rod guide, which comprises striking an arc to heat a portion of a workpiece to form a weld puddle, shielding the arc with a shielding medium, feeding filler rod through said guide into said weld puddle, maintaining said guide at an acute angle to the surface of the workpiece, and exerting sufficient pressure on said guide to contact the filler rod with the workpiece with sufficient friction to propel the torch along in the direction from which the filler rod is fed.

4. Method of gas shielded arc welding with an electrode connected to a source of welding current and carried by a torch movable along a line of weld and having a gas directing nozzle and a filler rod guide connected to the torch, which comprises striking an arc between said electrode and a workpiece connected to said source to form a weld puddle, passing a stream of shielding gas along said electrode and through said nozzle to shield the arc and weld puddle, maintaining said guide at an acute angle to the surface of the workpiece, feeding filler rod through said guide into said gas shielded weld puddle, and propelling said torch along the line of weld by contacting the filler rod with the workpiece adjacent the weld puddle with sufficient friction between the end of the rod where it is being melted by the arc stream between said electrode and the weld puddle to propel the torch along in the direction from which the filler rod is being fed.

5. Method of gas shielded arc welding with a substantially non-consumable electrode connected to a source of welding current and carried by a torch movable along a line of weld and having a gas directing nozzle and a filler wire guide tube connected to the torch, which comprises striking an arc between said substantially non-consumable electrode and a weld area of a workpiece connected to said source, passing a stream of shielding gas along said substantially non-consumable electrode and through said nozzle to shield the arc and weld area, and propelling said torch along the line of weld by feeding filler wire through said guide tube to contact the workpiece in the weld area and develop sufficient friction between the end of the wire where it is being melted by the arc stream between said substantially non-consumable electrode and weld area to propel the torch along in the direction from which the filler wire is being fed.

6. Method of gas shielded arc welding with an electrode connected to a source of welding current and carried by a torch movable along a line of weld and having a gas directing nozzle and a filler wire guide tube connected to the torch, which comprises striking an arc between said electrode and a workpiece connected to said source, passing a stream of shielding inert gas along said electrode and through said nozzle to shield the arc, feeding filler wire through said guide tube to melt the end of the wire in the arc stream between said electrode and the workpiece, and propelling said torch along the workpiece by maintaining pressure on said guide tube and the speed of rod feed sufficient to contact the wire with the workpiece with sufficient friction to propel the torch along in the direction from which the filler wire is being fed.

7. Method of gas shielded arc welding with an electrode connected to a source of welding current and carried by a torch movable along a line of weld and having a gas directing nozzle and a filler wire guide tube connected to the torch, which comprises striking an arc between said electrode and a weld area of a workpiece connected to said source, passing an annular stream of shielding gas along said electrode and through said nozzle to shield the arc and weld area, and propelling said torch along the line of weld by feeding filler wire through said guide tube at a speed of the order of from 60 to 80 inches per minute with wire from one to three thirty seconds of an inch diameter to contact the workpiece in the weld area and propel the torch along in the direction from which the filler wire is being fed.

8. Semi-automatic method of gas shielded arc welding with an electrode connected to a source of welding current and carried by a portable hand torch held by the operator and having a gas directing nozzle and a filler wire guide tube connected to the torch, which comprises striking an arc between said electrode and a weld area of a workpiece connected to said source, passing a stream of shielding gas along said electrode and through said nozzle to shield the arc and the weld area, and propelling the torch along a line of weld by feeding filler wire through said guide tube to contact the workpiece in the weld area and develop sufficient friction between the end of the wire where it is being melted by the arc stream between said electrode and weld area to propel the torch along in the direction from which the filler wire is being fed.

9. Semi-automatic apparatus for arc welding, comprising a portable hand gun having a handle to be guided by the operator and a head mounted transversely to said handle, electrode contacting means carried by said hand gun head, a source of welding current connected to said electrode contacting means and a workpiece, a filler rod guide, and bracket means for mounting said filler rod guide on the handle of said hand gun at a wide angle to the electrode for directing filler rod at an acute angle to the surface of the work into the weld puddle formed by the arc, a source of supply of filler rod, and a flexible conduit enclosing the filler rod being supplied and leading from said source to said guide on said hand gun, whereby said hand gun and its filler rod guide may be moved by said handle relatively freely with respect to said source of supply while the filler rod is passing through said flexible conduit.

10. Semi-automatic apparatus for arc welding, comprising a portable hand gun having a handle to be guided by the operator and a head mounted transversely to said handle, electrode contacting means carried by said hand gun head, a source of welding current connected to said electrode contacting means and a workpiece, a filler rod guide, and bracket means for mounting said filler rod guide on the handle of said hand gun at a wide angle to an electrode carried by said contacting means for directing filler rod at an acute angle to the surface of the work into the weld puddle formed by said arc, relatively stationary motorized rod feeding mechanism for supplying filler rod to said guide tube, a switch on said hand gun for starting and stopping said motor driven rod feed, a flexible insulated conductor connecting said switch to the motor of said feeding mechanism, and a flexible conduit extending from said mechanism to said guide on said hand gun and enclosing the moving filler rod whereby said hand gun may be moved by said handle relatively freely with respect to said relatively stationary rod feeding mechanism, while said rod is being fed through said conduit, and said switch may start or stop said feeding mechanism from any position of said hand gun resulting from such relatively free movement thereof.

11. In a portable gas blanketed arc welding torch having a handle to be held by an operator and a head mounted transversely to said handle, said head carrying an electrode and a gas directing nozzle, a bracket carried by said handle, a filler rod guide carried by said bracket at a wide angle to said head and below the outlet of said nozzle, and a tube carried by said bracket for supplying filler rod to said guide.

12. In a portable gas blanketed arc welding torch having a handle to be held by an operator and a head mounted transversely to said handle, said head carrying an electrode and a gas directing nozzle, a bracket carried by said handle, a filler rod guide carried by said bracket and having a cooling block, and conduits in said bracket for supplying filler rod to said guide and cooling medium to said block.

13. In a portable gas blanketed arc welding torch having a handle to be held by an operator and a head mounted transversely to said handle, said head carrying an electrode and a water cooled gas directing nozzle, a bracket carried by said handle, a filler rod guide carried by said bracket, and conduits in said bracket for supplying filler rod to said guide and cooling medium to said nozzle.

14. In a portable gas shielded arc welding torch, a frame comprising a handle portion, a head portion and a bracket portion, said handle portion being adapted to be held by an operator for manipulating the entire frame, said head portion extending transversely to said handle portion and carrying an electrode holder, a gas directing nozzle on said frame aligned with said electrode holder and having a water jacket, said bracket portion being hollow and extending from the rear of said handle portion down under the same toward the nozzle, and a conduit in said bracket portion for supplying cooling water to said nozzle water jacket.

15. In a portable gas shielded arc welding torch, a frame comprising a handle portion, a head portion and a bracket portion, said handle portion being adapted to be held by an operator for manipulating the entire frame, said head portion extending transversely to said handle portion and carrying an electrode holder, a gas directing nozzle on said frame aligned with said electrode holder and having a water jacket, said bracket portion being hollow and extending from the rear of said handle portion down under the same toward the nozzle; and conduit means for supplying shielding gas to said nozzle, welding current to said electrode holder, and cooling water to said nozzle; at least part of said conduit means passing through said hollow bracket portion.

16. In a portable gas shielded arc welding torch, a frame comprising a handle portion, a head portion, and a bracket portion, said handle portion being adapted to be held by an operator for manipulating the entire frame, said head portion extending transversely to said handle and carrying a water-cooled electrode holder, a water-cooled gas directing nozzle on said frame aligned with said electrode holder, said bracket portion being hollow and extending from the rear of said handle portion down under the same toward the nozzle, conduits comprising tubes for supplying cooling water to said electrode holder and nozzle and conductors for a control circuit and for supplying welding current to said electrode holder, certain of said conduits passing through said handle portion and the remainder thereof passing through said hollow bracket portion.

17. In a portable inert gas shielded arc welding torch, a frame comprising a handle, a head and a bracket, said handle being adapted to be held by an operator for manipulating the entire frame, said head extending transversely to said handle and carrying a water-cooled electrode holder and a water-cooled gas directing nozzle, said bracket being hollow and extending from the rear of said handle down under the same toward said nozzle, conduits passing through said bracket and said handle for supplying cooling water to said electrode holder and nozzle, and conductors in said bracket and handle for supplying welding current to said electrode.

References Cited in the file of this patent

UNITED STATES PATENTS

| | | |
|---|---|---|
| 1,477,538 | Carter et al. | Dec. 18, 1923 |
| 1,965,331 | Chapman | July 3, 1934 |
| 2,122,194 | Bixby | June 28, 1938 |
| 2,205,890 | Nicholson et al. | June 25, 1940 |
| 2,360,160 | Pickhaver | Oct. 10, 1944 |
| 2,398,355 | Bristol | Apr. 16, 1946 |
| 2,468,805 | Herbst | May 3, 1949 |
| 2,505,054 | McElrath et al. | Apr. 25, 1950 |
| 2,510,205 | Baird | June 6, 1950 |
| 2,571,684 | Craven | Oct. 16, 1951 |